(12) United States Patent
Lin et al.

(10) Patent No.: US 11,503,164 B2
(45) Date of Patent: Nov. 15, 2022

(54) MEDIA INTERACTION METHOD IN DECT NETWORK CLUSTER

(71) Applicant: YEALINK (XIAMEN) NETWORK TECHNOLOGY CO., LTD., Fujian (CN)

(72) Inventors: Yanzhang Lin, Fujian (CN); Huirong Zhang, Fujian (CN); Xiaosheng Lin, Fujian (CN)

(73) Assignee: YEALINK (XIAMEN) NETWORK TECHNOLOGY CO., LTD., Xiamen (CN)

(*) Notice: Subject to any disclaimer, the term of this patent is extended or adjusted under 35 U.S.C. 154(b) by 130 days.

(21) Appl. No.: 17/085,561

(22) Filed: Oct. 30, 2020

(65) Prior Publication Data

US 2021/0136232 A1 May 6, 2021

(30) Foreign Application Priority Data

Oct. 30, 2019 (CN) .......................... 201911047723.6

(51) Int. Cl.
*H04M 7/00* (2006.01)
*H04M 1/72505* (2021.01)
*H04M 3/42* (2006.01)

(52) U.S. Cl.
CPC ....... *H04M 7/006* (2013.01); *H04M 1/72505* (2013.01); *H04M 3/42238* (2013.01); *H04M 2250/08* (2013.01)

(58) Field of Classification Search
CPC ............. H04M 7/006; H04M 1/72505; H04M 3/42238; H04M 2250/08; H04L 65/1006; H04L 65/1036; H04L 65/105; H04L 65/1069; H04L 65/1089; H04L 69/16; H04L 65/608; H04W 4/08; H04W 76/15;
(Continued)

(56) References Cited

U.S. PATENT DOCUMENTS

| | | | | |
|---|---|---|---|---|
| 2005/0286466 | A1* | 12/2005 | Tagg | H04W 76/12 370/329 |
| 2007/0189269 | A1* | 8/2007 | Ho | H04L 65/4038 370/352 |
| 2007/0280252 | A1* | 12/2007 | Chuang | H04L 65/105 370/395.2 |

OTHER PUBLICATIONS

Jia, Wen Kang, and Yaw-Chung Chen. "A teletraffic perspective on relay-node selection strategy in VoP2P system." 2009 IEEE International Conference on Networking, Architecture, and Storage. IEEE, 2009. (Year: 2009).*

* cited by examiner

*Primary Examiner* — Sharad Rampuria

(57) ABSTRACT

The present application discloses a media interaction method in a Digital Enhanced Cordless Telecommunications (DECT) network cluster. Communication with a DECT host is established through a DECT network cluster constructed in advance, to obtain first account information allocated by the DECT host, and information of a first call request to call a second account is sent to the DECT host, so as to make a call to the second account in a first communication manner. If no Real-time Transport Protocol (RTP) from the second account is received, information of a second call request to call the second account is sent to the DECT host, so as to make a call to the second account in a second communication manner. Embodiments of the present disclosure can solve the technical problem of a communication failure and reduce a waiting time for communication, thereby achieving optimal Voice over Internet Protocol (VOIP) call experience.

9 Claims, 3 Drawing Sheets

(58) Field of Classification Search
CPC ..... H04W 68/00; H04W 76/10; H04W 88/02; H04W 88/06; H04W 92/02
See application file for complete search history.

MEDIA INTERACTION METHOD IN DECT NETWORK CLUSTER

CROSS REFERENCE TO RELATED APPLICATIONS

This application claims priority to Chinese Patent Application Number 201911047723.6, filed on Oct. 30, 2019, which is herein incorporated by reference.

TECHNICAL FIELD

The present application relates to the technical field of Digital Enhanced Cordless Telecommunications (DECT), and in particular to a media interaction method in a DECT network cluster.

BACKGROUND

Wireless coverage of DECT is limited, and a handle is incapable of communication once leaving the wireless coverage of an original Base. Therefore, DECT clustering emerges. In the clustering system, a DM device generally has higher network privileges (such as a network white list), so that the DM can register with a public network server. A Base in the clustering system only needs to interact with the DM. Therefore, the Base generally does not need to have high-level network privileges, so the Base is not always capable of accessing an external network.

Therefore, when the Base makes a Voice over Internet Protocol (VOIP) call, it cannot be foreseen whether interaction is performed through Real-time Transport Protocol Peer To Peer (RTP P2P) or RTP Relay, resulting in technical problems of a long waiting time for communication and a communication failure. Therefore, the call experience is poor.

SUMMARY

An objective of embodiments of the present disclosure is to provide a media interaction method in a DECT network cluster, which can solve the technical problem of a communication failure and reduce a waiting time for communication, thereby achieving optimal VOIP call experience.

To achieve the above objective, embodiments of the present disclosure provide a media interaction method in a DECT network cluster, including:

establishing communication with a DECT host through a DECT network cluster constructed in advance;

obtaining first account information allocated by the DECT host;

sending information of a first call request to call a second account to the DECT host, so as to make a call to the second account in a first communication manner; and if no Real-time Transport Protocol (RTP) from the second account is received, sending information of a second call request to call the second account to the DECT host, so as to make a call to the second account in a second communication manner.

Further, the establishing communication with a DECT host through a DECT network cluster constructed in advance specifically includes:

after the DECT host sends a multicast command that declares joining a specified multicast group to a router, sending a multicast probe message sent to a target multicast group to the router, so that according to the multicast command, the router sends the multicast probe message of which the target multicast group is the specified multicast group to the DECT host;

receiving status declaration information sent by the DECT host in a peer-to-peer (P2P) manner according to the multicast probe message after the DECT host receives the multicast probe message, and initiating a Transmission Control Protocol (TCP) connection request to the DECT host in a P2P manner according to the status declaration information; and after the DECT host receives the connection request, establishing a TCP channel with the DECT host.

Further, the first call request is used for requesting the DECT host to call the second account in the first communication manner; and the first communication manner is an RTP P2P communication manner.

Further, the sending information of a first call request to call a second account to the DECT host, so as to make a call to the second account in a first communication manner, specifically including:

sending, to the DECT host, the information of the first call request to make an RTP P2P call to the second account, so that the DECT host invites, according to the information of the first call request and by carrying a first IP of a local, the second account to have a call with the local; and when the second account returns a third IP of the second account and the second account receives an ACK, successfully having a call with the second account.

Further, the second call request is used for requesting the DECT host to call the second account in the second communication manner; and the second communication manner is an RTP Relay communication manner.

Preferably, embodiments of the present invention also provide a media interaction system in a DECT network cluster, including:

Further, the sending information of a second call request to call the second account to the DECT host, so as to make a call to the second account in a second communication manner if no RTP from the second account is received, specifically including:

if no RTP from the second account is received, sending information of a second call request to make an RTP Relay call to the second account to the DECT host, so that the DECT host invites, according to the information of the second call request, the second account to have a call with the DECT host by carrying a second IP of the DECT host; and when the second account returns a third IP of the second account and the second account receives an ACK, successfully having a call with the second account through the DECT host.

Further, the media interaction method in a DECT network cluster also includes:

sending an RTP to the second account for probing during communication in the first communication manner, to maintain the call.

Further, the media interaction method in a DECT network cluster also includes:

sending an RTP to the DECT host during communication in the second communication manner, so that the DECT host, while receiving an RTP sent by the second account at the same time, uniformly distributes corresponding RTPs to maintain the call.

The present disclosure has the following beneficial effects as compared with the prior art:

In the media interaction method in a DECT network cluster according to the embodiments of the present disclosure, communication with a DECT host is established through a DECT network cluster constructed in advance, to obtain first account information allocated by the DECT host, and information of a first call request to call a second account is sent to the DECT host, so as to make a call to the second account in a first communication manner. If no RTP from the second account is received, information of a second call request to call the second account is sent to the DECT host, so as to make a call to the second account in a second communication manner. The embodiments of the present disclosure can solve the technical problem of a communication failure and reduce a waiting time for communication, thereby achieving optimal VOIP call experience.

DETAILED DESCRIPTION

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

It should be noted that, the implementations in the present disclosure and the features in the implementations may be combined with each other if no conflict occurs. The embodiments of the present disclosure will be described in detail below with reference to the accompanying drawings and the implementations.

Some of the terms are explained blow:

DECT: Digital Enhanced Cordless Telecommunications.

DECT clustering: all devices with a DECT service are associated in terms of services, to communicate with each other.

Base: a DECT device with a VOIP service (which may be construed as a Mini base station similar to a cell phone); this application is described with the Base as a subject, and the Base is also referred to as a local in some embodiments.

DM: a host that performs service clustering on all Bases in a local area network, also referred to as a DECT host in this application.

Multicast protocol: Multicast, which implements a one-to-many connection from a transmitter to receivers.

RTP: a media protocol during a VOIP call.

RTP P2P: media peer-to-peer, that is, direct exchange of media between two terminals.

RTP Relay: media forwarding, that is, media of two terminals is exchanged through a relay of a third-party server, where the third-party server in this application is a DM.

Figure 1:
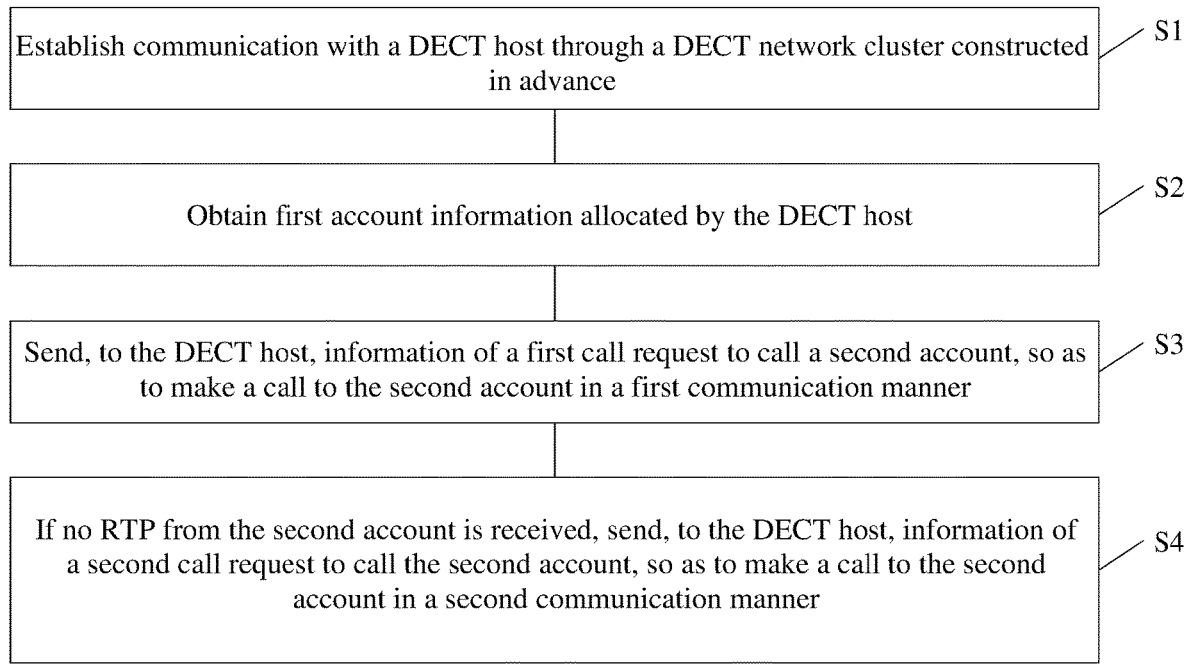
FIG. 1 is a schematic flowchart of an embodiment of a media interaction method in a DECT network cluster according to the present disclosure.

Referring to FIG. 1, FIG. 1 is a schematic flowchart of an embodiment of a media interaction method in a DECT network cluster according to the present disclosure. A media interaction method in a DECT network cluster provided in this embodiment of the present disclosure includes steps S1 to S4.

Step S1: establish communication with a DECT host through a DECT network cluster constructed in advance.

Step S2: obtain first account information allocated by the DECT host.

Step S3: send information of a first call request to call a second account to the DECT host, so as to make a call to the second account in a first communication manner.

Step S4: if no RTP from the second account is received, send information of a second call request to call the second account to the DECT host, so as to make a call to the second account in a second communication manner.

In an embodiment of the present disclosure, the first call request is used for requesting the DECT host to call the second account in the first communication manner; the first communication manner is an RTP P2P communication manner.

Step S3 includes steps S301 to S302.

Step S301: send, to the DECT host, the information of the first call request to make an RTP P2P call to the second account, so that the DECT host invites, according to the information of the first call request and by carrying a first IP of a local, the second account to have a call with the local.

Step S302: when the second account returns a third IP of the second account and the second account receives an ACK, the call with the second account succeeds.

Figure 2:
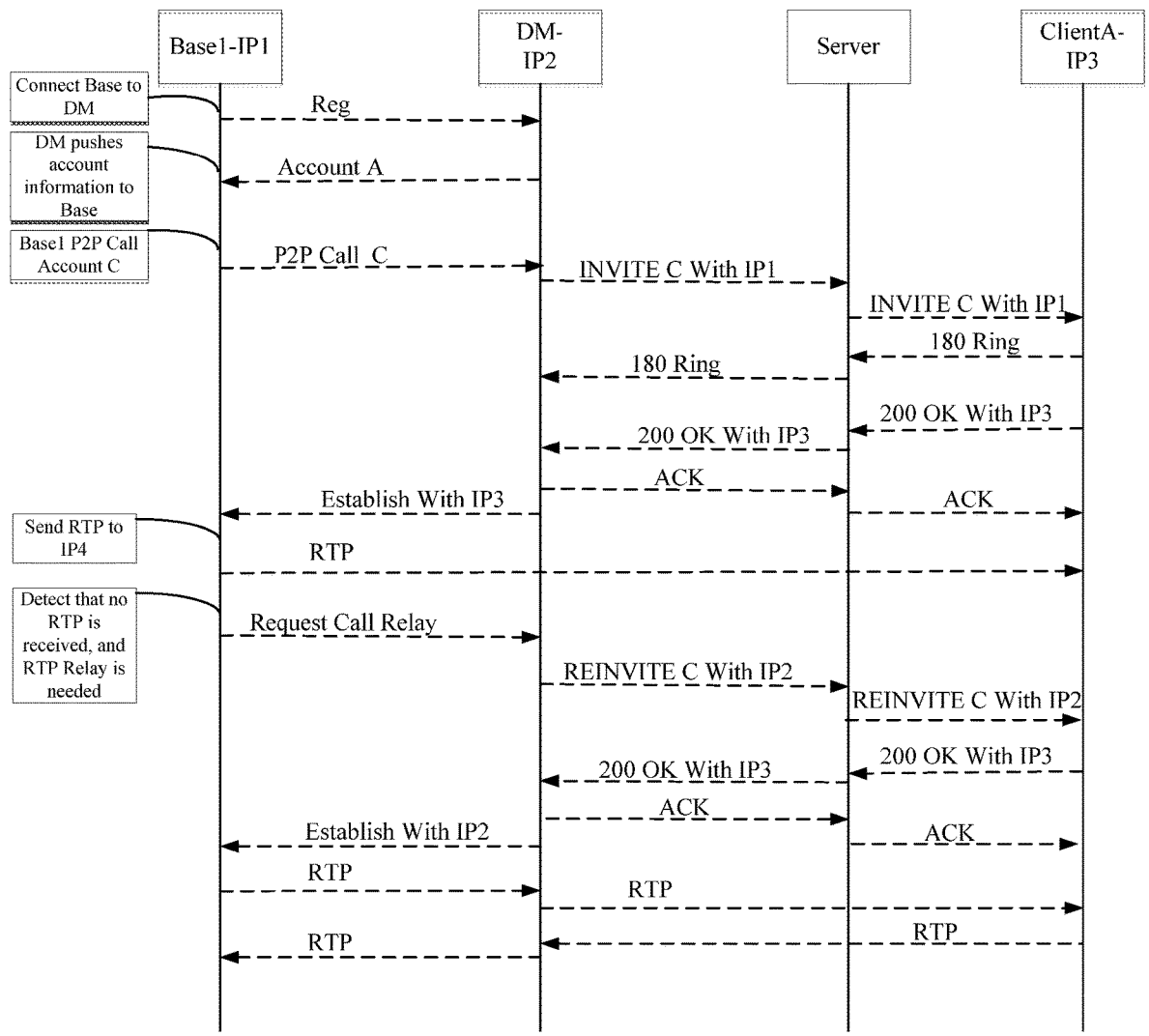
FIG. 2 is a diagram of a working principle of an embodiment of a media interaction method in a DECT network cluster according to the present disclosure.

In a preferred embodiment of the present disclosure, referring to FIG. 2, FIG. 2 is a diagram of a working principle of an embodiment of a media interaction method in a DECT network cluster according to the present disclosure. Specific steps for implementing the present disclosure are described as follows: First, a Base is connected to a DM. After the Base is connected to the DM, the DM allocates account information to the Base, for example, an account A. Then, the Base calls an Account C (assuming that a Client A registers the Account C). Because the Base does not know whether it can be directly interconnected with the Client A, the Base first requests the DM to call the Account C in an RTP P2P manner. After receiving the request message from the Base, the DM invites the Client A by carrying an IP (IP1) of the Base, and the Client A responds to the call and returns an IP (IP3) address of the Client A. After the Client A receives an ACK, the call process is completed. The Base directly performs RTP P2P communication with the Client A.

In another embodiment of the present disclosure, the second call request is used for requesting the DECT host to call the second account in the second communication manner; the second communication manner is an RTP Relay communication manner.

Step S4 includes steps S401 to S402.

Step S401: if no RTP from the second account is received, send information of a second call request to make an RTP Relay call to the second account to the DECT host, so that the DECT host invites, according to the information of the second call request by carrying a second IP of the DECT host, the second account to have a call with the DECT host.

Step S402: when the second account returns a third IP of the second account and the second account receives an ACK, the call with the second account succeeds through the DECT host.

In a preferred embodiment of the present disclosure, further referring to FIG. 2, the Base performs an RTP probe. If an RTP from the IP3 is received, the Base maintains RTP P2P with the Client A; otherwise, the Base switches to RTP Relay: the Base requests the DM to switch from the RTP P2P to the RTP Relay manner; after receiving the request, the DM reinvites the Client A by carrying the IP (IP2) of the DM, until the Client A receives an ACK again, thus completing the current REINVITE call.

It should be noted that, the Client A sends the RTP to the DM (that is, the IP2), and the Base also sends the RTP to the DM. The DM performs uniform media distribution, to achieve a media forwarding effect.

Preferably, when step S3 and steps S301 to S302 are performed, the method further includes step S310.

S310: send an RTP to the second account for probing during communication in the first communication manner, to maintain the call.

When step S4 and steps S401 to S402 are performed, the method further includes step S410.

S410: send an RTP to the DECT host during communication in the second communication manner, so that the DECT host, while receiving an RTP sent by the second account at the same time, uniformly distributes corresponding RTPs to maintain the call.

Figure 3:
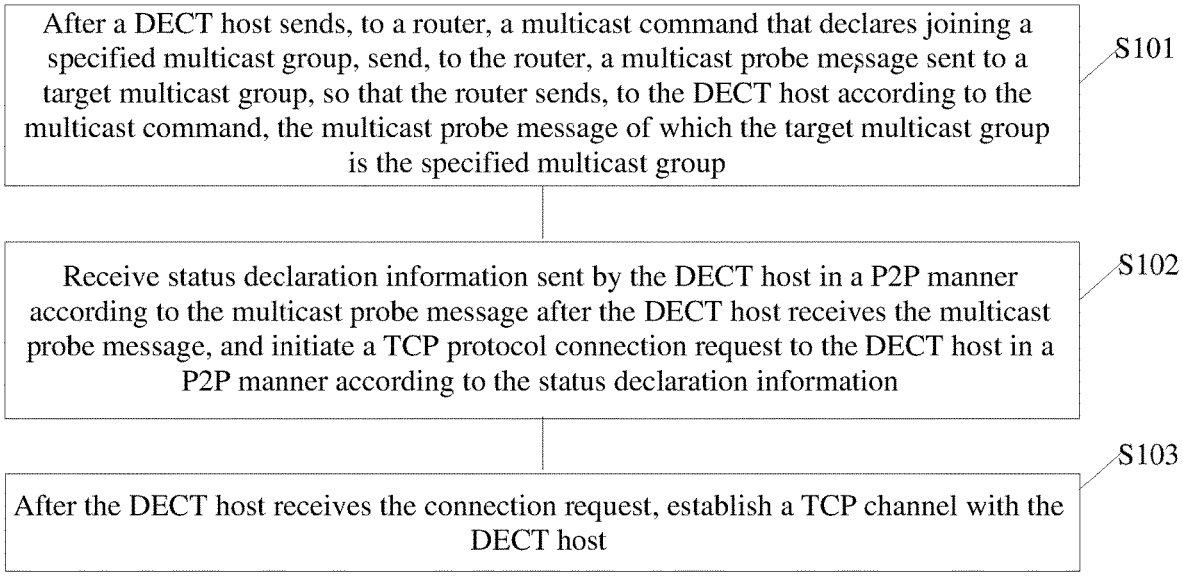
FIG. 3 is a schematic flowchart of an embodiment of a method for constructing a DECT network cluster according to the present disclosure.

Referring to FIG. 3, FIG. 3 is a schematic flowchart of an embodiment of a method for constructing a DECT network cluster according to the present disclosure, including steps S101 to S103.

Step S101: after the DECT host sends a multicast command that declares joining a specified multicast group to a router, send a multicast probe message sent to a target multicast group to the router, so that according to the multicast command, the router sends the multicast probe message of which the target multicast group is the specified multicast group to the DECT host.

Step S102: receive status declaration information sent by the DECT host in a P2P manner according to the multicast probe message after the DECT host receives the multicast probe message, and initiate a Transmission Control Protocol (TCP) connection request to the DECT host in a P2P manner according to the status declaration information.

In step S103: after the DECT host receives the connection request, establish a TCP channel with the DECT host.

This embodiment of the present disclosure needs to be implemented before the first embodiment of the present disclosure, to establish a communication connection between the Base and the DM.

In step S101, step S101 may be performed after the DECT host is started. The multicast command that declares joining the specified multicast group is sent to the router through the DECT host. If the router receives network data sent to the specified multicast group, the router sends a copy of the message to the DECT host, and the Base sends to the router the multicast probe message sent to the target multicast group, so that according to the multicast command, the router sends the multicast probe message of which the target multicast group is the specified multicast group to the DECT host.

It should be noted that, the message used in the present disclosure is a multicast probe message sent by the Base to the target multicast group; moreover, the specified multicast group may be expressed by using a multicast address, such as 224.2.10.10.

Preferably, the multicast probe message includes address information of the Base, such as a Media Access Control (MAC) address of the Base, so that the DECT host can send the status declaration information to the Base according to the multicast probe message. The status declaration information no longer needs to be sent through a multicast protocol, thus reducing impact on the network bandwidth.

In step S102, the DECT host receives the multicast probe message, and sends the status declaration information to the Base according to the multicast probe message; the Base receives the status declaration information, and initiates the TCP protocol connection request to the DECT host according to the status declaration information. The DECT host sends the status declaration information to the corresponding Base according to address information contained in the multicast probe message. The Base determines a DECT host address according to the status declaration information, so as to initiate the TCP protocol connection request to the corresponding DECT host according to the status declaration information. In the status declaration information, information used by the Base to determine the DECT host address may be an IP address and a TCP listening port of the DECT host. The status declaration information may further include a MAC address of the DECT host.

In a preferred embodiment of the present disclosure, by repeating steps S101 to S103, the DECT host and other Bases in a local area network may establish TCP channels, thereby implementing clustering of a DECT network and improving DECT experience.

According to the method in the present disclosure, the multicast probe message is a multicast message, and multicast protocol communication is adopted, so that broadcasting is not needed, thereby reducing a bandwidth requirement. Moreover, step S102 to step S103 do not need to adopt multicast protocol communication, but adopt P2P interaction, thus further reducing impact on the network bandwidth.

As can be learned, the step of establishing a TCP channel with the Base by the DECT host includes returning a connection acknowledgment request to the Base. The TCP channel may be established through three handshakes, and details are not described in the present disclosure.

In the media interaction method in a DECT network cluster according to the embodiments of the present disclosure, communication with a DECT host is established through a DECT network cluster constructed in advance, to obtain first account information allocated by the DECT host, and information of a first call request to call a second account is sent to the DECT host, so as to make a call to the second account in a first communication manner. If no RTP from the second account is received, information of a second call request to call the second account is sent to the DECT host, so as to make a call to the second account in a second communication manner. The embodiments of the present disclosure can solve the technical problem of a communication failure and reduce a waiting time for communication, thereby achieving optimal VOIP call experience.

The embodiments of the present disclosure have the following beneficial effects:

(1) Communication is performed by using a multicast protocol, so that broadcasting is not needed. Moreover, a DECT network cluster is constructed through P2P interaction, which greatly reduces a bandwidth requirement.

(2) The Base preferably selects RTP P2P, and switches to RTP Relay if no RTP is received, thus solving the technical problem of a communication failure, reducing a waiting time for communication, and achieving optimal VOIP call experience.

It should be noted that, the system embodiment described above is merely an example, where units described as separate components may or may not be physically separated. Components displayed as units may or may not be physical units, that is, the components may be located in one place, or may be distributed to multiple network units. Some or all of the modules may be selected according to actual needs to achieve the objective of the solution of the example. In addition, in the drawings of the embodiments provided in the present disclosure, a connection relationship between components represent a communication connection between the components, which may be specifically implemented as one or more communication buses or signal lines. Those of ordinary skill in the art can understand and implement the embodiments without creative effort.

The descriptions above are preferred embodiments of the present disclosure, and it should be noted that for those of ordinary skill in the art, various improvements and modifications can be made without departing from the principles of the present disclosure. These improvements and modifications should also be regarded as falling into the protection scope of the present disclosure.

The invention claimed is:

1. A media interaction method in a Digital Enhanced Cordless Telecommunications (DECT) network cluster, comprising:
   establishing communication with a DECT host through a DECT network cluster constructed in advance;
   obtaining first account information allocated by the DECT host;
   sending information of a first call request to call a second account to the DECT host, so as to make a call to the second account in a first communication manner; and
   if no Real-time Transport Protocol (RTP) from the second account is received, sending information of a second call request to call the second account to the DECT host, so as to make a call to the second account in a second communication manner;
   wherein the first call request is used for requesting the DECT host to call the second account in the first communication manner; and
   the first communication manner is an RTP P2P communication manner;
   wherein the second call request is used for requesting the DECT host to call the second account in the second communication manner; and
   the second communication manner is an RTP Relay communication manner.

2. The media interaction method in a DECT network cluster according to claim 1, wherein the establishing communication with a DECT host through a DECT network cluster constructed in advance specifically comprises:
   after the DECT host sends a multicast command that declares joining a specified multicast group to a router, sending a multicast probe message sent to a target multicast group to the router, so that according to the multicast command, the router sends the multicast probe message of which the target multicast group is the specified multicast group to the DECT host;
   receiving status declaration information sent by the DECT host in a peer-to-peer (P2P) manner according to the multicast probe message after the DECT host receives the multicast probe message, and initiating a Transmission Control Protocol (TCP) connection request to the DECT host in a P2P manner according to the status declaration information; and
   after the DECT host receives the connection request, establishing a TCP channel with the DECT host.

3. The media interaction method in a DECT network cluster according to claim 1, wherein the sending information of a first call request to call a second account to the DECT host, so as to make a call to the second account in a first communication manner, specifically comprising:
   sending, to the DECT host, the information of the first call request to make an RTP P2P call to the second account, so that the DECT host invites, according to the information of the first call request and by carrying a first IP of a local, the second account to have a call with the local; and
   when the second account returns a third IP of the second account and the second account receives an ACK, successfully having a call with the second account.

4. The media interaction method in a DECT network cluster according to claim 1, wherein the sending information of a second call request to call the second account to the DECT host, so as to make a call to the second account in a second communication manner if no RTP from the second account is received, specifically comprising:
   if no RTP from the second account is received, sending information of a second call request to make an RTP Relay call to the second account to the DECT host, so that the DECT host invites, according to the information of the second call request, the second account to have a call with the DECT host by carrying a second IP of the DECT host; and
   when the second account returns a third IP of the second account and the second account receives an ACK, successfully having a call with the second account through the DECT host.

5. The media interaction method in a DECT network cluster according to claim 1, further comprising:
   sending an RTP to the second account for probing during communication in the first communication manner, to maintain the call.

6. The media interaction method in a DECT network cluster according to claim 2, further comprising:
   sending an RTP to the second account for probing during communication in the first communication manner, to maintain the call.

7. The media interaction method in a DECT network cluster according to claim 1, further comprising:
   sending an RTP to the second account for probing during communication in the first communication manner, to maintain the call.

8. The media interaction method in a DECT network cluster according to claim 3, further comprising:
   sending an RTP to the second account for probing during communication in the first communication manner, to maintain the call.

9. The media interaction method in a DECT network cluster according to claim 5, further comprising:
   sending an RTP to the DECT host during communication in the second communication manner, so that the DECT host, while receiving an RTP sent by the second account at the same time, uniformly distributes corresponding RTPs to maintain the call.

* * * * *